INVENTOR
CHARLES F. W. THORLIN
BY Larson and Taylor
ATTORNEYS 3,551,050
DISTANCE MEASURING DEVICE HAVING A COMMON OPTICAL SYSTEM FOR THE TRANSMITTED AND RECEIVED BEAMS
Charles Fredrik Wilhelm Thorlin, Stockholm, Sweden, assignor to AGA Aktiebolag, Lidingo, Sweden, a corporation of Sweden
Continuation of application Ser. No. 414,544, Nov. 30, 1964. This application Nov. 7, 1968, Ser. No. 776,853
Claims priority, application Sweden, Dec. 12, 1963, 13,805/63
Int. Cl. G01c 3/08
U.S. Cl. 356—4                        6 Claims

ABSTRACT OF THE DISCLOSURE

An optical device for measuring distance includes a common optical system, for example a telescope, which is divided by a light-impervious partition into separate sections for the transmitted and for the received light beams.

This application is a continuation of my copending application Ser. No. 414,544, filed Nov. 30, 1964.

The invention relates to distance measuring devices comprising a transmitter for generating a primary beam of light to be transmitted in a certain direction and a receiver for receiving a secondary beam from the same direction. In this type of devices, a determination of the distance to a distant object, from which the secondary beam is thrown back by reflection or in any other way, takes place by way of a comparison of some property of the primary and of the secondary beam, for instance by a phase measurement.

It is known in distance measuring devices of this type to transmit the primary beam through an optical system of telescope type and to receive the secondary beam in a similar system. This makes it necessary to use a comparatively large number of optical elements.

The invention has for its object to obviate this disadvantage and is characterized by a common optical system for the transmitter and the receiver, the system being divided by an opaque partition into a section for the primary and a section for the secondary beam.

Figure 1:
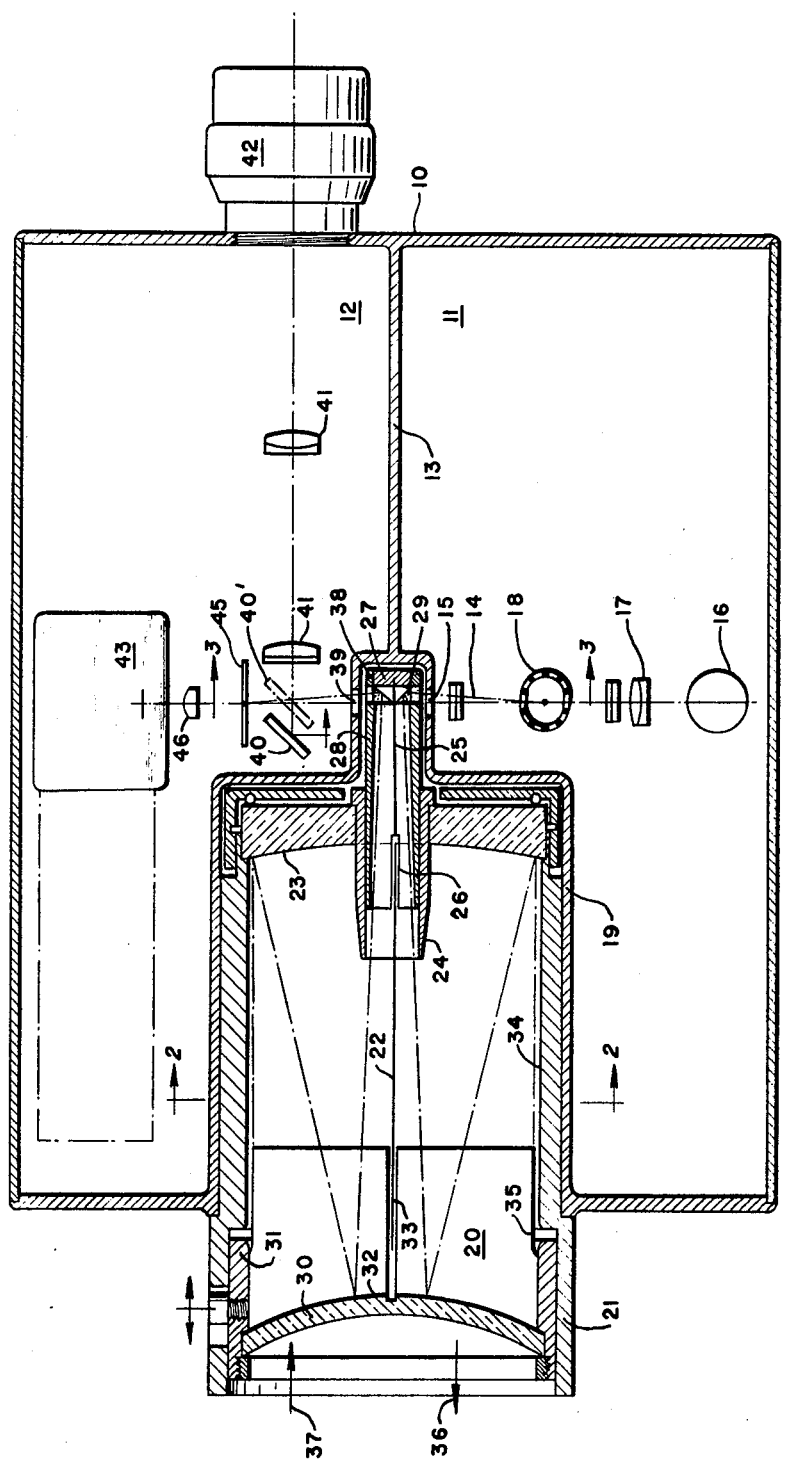
Figure 3:
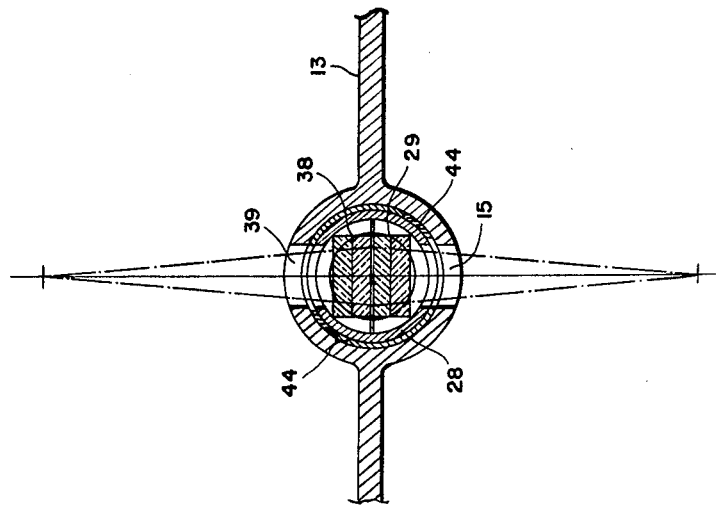
Figure 2:
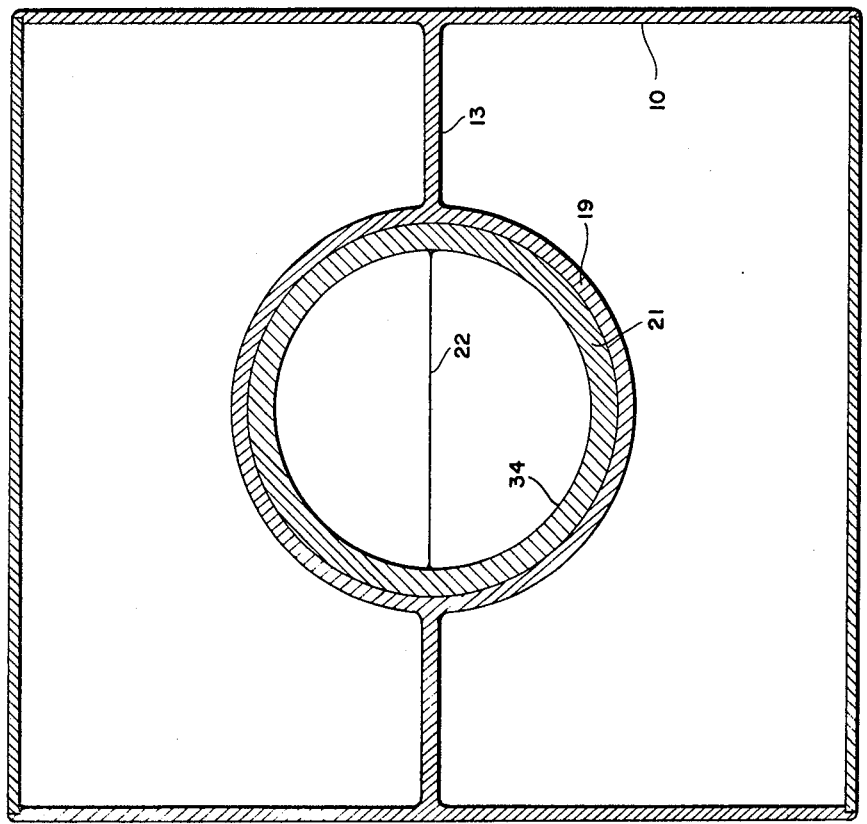

An embodiment of the invention is illustrated on the attached drawing, in which:

FIG. 1 is a longitudinal section,
FIG. 2 a cross-section on the line II of FIG. 1, and
FIG. 3 an enlarged cross-section on the line III of FIG. 1.

The distance measuring device is lodged in a housing 10 comprising a transmitter compartment 11 and a receiver compartment 12, which are separated by an opaque partition 13.

The transmitter compartment contains a transmitter for producing a primary beam of light 14 which leaves the compartment through an aperture 15. A light source 16 produces light which passes through a lens 17 to a Kerr cell 18 and is then projected to the aperture 15.

The housing 10 is provided at its front end with a section 19 projecting inwardly and forming a recess, into which a dismountable unit 20 comprising a common optical system for transmitting and receiving can be inserted. The optical system in the embodiment shown is of telescope type and is lodged in a housing 21. The system is subdivided by an opaque partition 22 in one section for the primary beam to be transmitted and one section for the secondary beam to be received.

Mounted in the inner end of the housing 21 is a concave reflector 23 having a central aperture, into which there is inserted a telescopically adjustable sleeve 24, the inner end of which extends into the narrower portion of the recess 19. To make possible the telescopic displacement, the portion 25 of the opaque partition situated within the sleeve 24 is divided at its front end 26 into two leaves, which accommodate between them the partition 22. In the opposite direction, the partition 25 extends up to an end piece 27 closing the inner end of the sleeve, whereby a division into two sections is obtained, which are separated from each other without the possibility of light passing from one section to the other. The telescopically adjustable inner portion 28 of the sleeve 24 supports a pair of prisms 29 in contact with the end piece 27. The prisms 29 are aligned with apertures corresponding to the aperture 15 for the primary beam on one side and the symmetrically corresponding aperture 39 on the other side.

An impervious packing 44 is shown in FIG. 3 to be placed between the free space formed between the tube 28 and the narrower portion of the recess 19. In the path of the secondary beam is provided a shutter 45 and a lens 46.

In the front end of the unit 20 is inserted a spherical glass disc 30, which is held in a telescopically adjustable sleeve 31. The inner convex surface of the disc 30 is aluminized on the central part 32 thereof, whereby this part serves as a convex reflector in the manner indicated on the drawing. The front portion 33 of the impervious partition 22 is also divided into two leaves accommodating between them the middle portion of the partition 22, whereby axial displacement of the sleeve 31 is possible. It may be suitable in connection with attaching the parts together to let the partition 22 form a diametrically placed central partition of a cylinder 34 which can be inserted into the sleeve 21, as is also apparent from FIG. 2. Also the remaining portions 25, 26, and 33 of the partition may be connected with such cylindrical shells, such as the cylindrical shell 35 connected with the partition 33 and having a narrower inwardly turned portion so as to enable axial displacement within the shell 34. To provide impermeability of light between the transmitting and the receiving side at the optical surfaces 23 and 30, they are preferably provided with a notch, into which the partition 33 and the partition 22 are inserted. The mechanical arrangements for the adjusting movement may be of any known type, as may the mechanical construction in general, so that no detailed description thereof is necessary.

The primary beam 14 is deflected by the prism 29, reflected by the reflector surface 32 and then by the concave reflector 23 and is transmitted in the direction indicated by the arrow 36.

The returning secondary beam 37 penetrates in a corresponding manner via the prism 38, which is the symmetrical counterpart to the prism 29, and the aperture 39 corresponding to the aperture 15 into the receiver compartment 12, which contains any known type of equipment for measuring some property of the secondary beam so as to determine the distance. A displaceable glass plate 40 can be adjusted into the position designated 40' and shown in dash lines, whereby received light is deflected via an optical system 41 to an eyepiece 42 enabling sighting of the distance measuring device on a target. 43 indicates a photocell for picking up the secondary beam and transforming it into electrical current.

The primary beam may be modulated to vary in a regular periodic manner by means of the Kerr cell 18 and by determining the time that passes from the highest amplitude value of the primary beam until the returning secondary beam reaches its highest amplitude, one obtains the time required by the light to cover the distance to be measured, which makes it possible to determine this distance. Stated differently, the phase difference between the outgoing primary signal and the returning secondary signal represents the distance to be measured. An interior known comparison path is provided, the system 20 leaving a free path for the light through the apertures 15 and 39 if the housing 21 is pulled out somewhat, which makes it possible for the transmitted beam to reach the receiving compartment direct.

The housing 10 may be formed of two separate parts for the compartments 11 and 12, which may be held together by bolts or other means. This make sit possible to replace the transmitting and the receiving unit separately.

What is claimed is:

1. A distance measuring device comprising, a generating means for generating a primary light beam and a transmitter means for transmitting the primary light beam in a certain direction toward an object, a receiver means for receiving a secondary light beam from said object in a direction substantially parallel to said certain direction; a photoelectric sensing means for picking up said primary beam and said secondary beam so that a property representing the primary beam can be compared with a similar property of said secondary beam to determine the distance between said device and said object, and a common optical system for both said primary light beam transmitted by the transmitter means to the object and the secondary light beam received from the object by the receiver means, said common optical system including at least one unitary continuous optical element common to both said primary beam and said secondary beam, said optical element including a first portion and a second portion, said primary beam including a first optical path which includes said first portion of the optical element, and said secondary beam including a second optical path which includes the second portion of the optical element, the optical axis of said optical element being substantially parallel to said certain direction, and an impervious partition extending generally parallel to said certain direction and substantially completely separating the optical system and said unitary optical element into a primary section which includes the said first portion of the optical element and a secondary section which includes the said second portion of the optical element, such that the partition prevents light from passing from either one of said sections to the other section.

2. A distance measuring device according to claim 1 wherein said generating means, said sensing means, a portion of said transmitter means and a portion of said receiver means are built together to form a first unit and said common optical system comprises a self-contained structural unit telescopically dismountable from the said first unit.

3. A distance measuring device according to claim 2 wherein the said first unit is arranged in a housing which is subdivided by an impervious partition into a transmitter compartment locating said generating means and said portion of the transmitter means and a receiver compartment locating said sensing means and said portion of said receiver means.

4. A distance measuring device as claimed in claim 2 wherein said first unit contains a recess and said structural unit is provided in a recess of the first unit.

5. A distance measuring device according to claim 1 wherein said common optical system comprises a telescope, the optical surfaces of which have optical axes which lie in said predetermined direction and which are subdivided into said primary and secondary sections by said impervious partition.

6. A distance measuring device according to claim 7, wherein the transmitter means and the receiver means includes means for transmitting and receiving a light beam which varies in a regular periodic manner, such that the difference in phase between the outgoing primary light beam and the returning secondary light beam is representative of the distance to be measured.

References Cited
UNITED STATES PATENTS

| | | | |
|---|---|---|---|
| 3,411,852 | 11/1968 | Marinozzi | 250—219X |
| 2,216,003 | 9/1940 | Eppenstein et al. | 88—14(EP) |
| 3,011,384 | 9/1961 | Biber | 88—14(A)X |
| 2,956,472 | 10/1960 | Hildebrand | 88—1(U) |
| 3,164,725 | 1/1965 | Straub | 88—1(U)X |
| 3,256,766 | 6/1966 | Allesson | 88—1(C) |

OTHER REFERENCES

Hansen: "Surveying with Pulsed-Light Radar," Electronics, July 1948, pp. 76–79.

RONALD L. WIBERT, Primary Examiner

F. L. EVANS, Assistant Examiner